United States Patent
Hao et al.

Patent Number: 5,844,553
Date of Patent: Dec. 1, 1998

[54] MECHANISM TO CONTROL AND USE WINDOW EVENTS AMONG APPLICATIONS IN CONCURRENT COMPUTING

[75] Inventors: Ming C. Hao, Los Altos Hills; Alan H Karp, Palo Alto, both of Calif.; Daniel Garfinkel, Fort Collins, Colo.; Charles Young, Palo Alto, Calif.; Thomas G. Fincher, Hudson, N.H.

[73] Assignee: Hewlett-Packard Company, Palo Alto, Calif.

[21] Appl. No.: 625,615

[22] Filed: Mar. 29, 1996

Related U.S. Application Data

[63] Continuation-in-part of Ser. No. 602,386, Feb. 16, 1996, Pat. No. 5,742,778, which is a continuation of Ser. No. 113,790, Aug. 30, 1993, abandoned.

[51] Int. Cl.[6] .................................................. G06F 15/00
[52] U.S. Cl. ........................ 345/329; 345/330; 345/340; 395/200.31; 395/200.34; 395/200.44
[58] Field of Search ..................................... 395/329, 330, 395/331, 332, 825, 824, 200.31, 200.34, 200.44, 200.57, 200.6, 200.62, 200.68; 345/329, 330, 331, 339, 340

[56] References Cited

PUBLICATIONS

Ming C. Hao et al, "Concurrent Application Control in Collaborative Computing", 1994, pp. 1–13.
Hughes et al., "Bifidobacteria: Their Potential For Use In American Dairy Products", pp. 74–81 in *Food Technology* (Apr. 1991).

*Primary Examiner*—Huynh Ba

[57] ABSTRACT

A new application sharing technology that enables sharing of many single-user non-modified applications between two or more workstations. It provides concurrent sharing of existing multiple applications with no change in a distributed environment. It permits real-time sharing of distributed applications based on a fundamental window hierarchical mapping and user interactions. Control is centralized but the data and program are replicated. It is event driven with agent assistance. The new event capturing capability is automatically triggered by user interactions on entering/leaving the shared window. The event capturing capability starts when the user moves the pointer into the shared windows. The event capturing ends when the user moves the pointer out of the shared windows. The new multicasting scope is defined in a shared window hierarchy data array. This global data array is dynamically created at run time on an as-needed basis. Because this mechanism only processes user input events such as mouse, keyboard or cursor movement (commands), no output graphic data transmission across the network is required. Therefore, this approach is extremely light-weight and provides secure transmission without requiring intensive encryption. Because it is not using pseudo server interception, this approach can support DHA 3-D rendering. Also, the agent can dynamically mediate resources and normalize environment differences. This permits real-time sharing of 3-D, graphic and DHA (direct hardware access) applications. DHA permits the application to bypass the windowing server to render graphics on display. Moreover, because it is extremely light-weight, high network bandwidth is not required.

15 Claims, 11 Drawing Sheets

MECHANISM TO CONTROL AND USE WINDOW EVENTS AMONG APPLICATIONS IN CONCURRENT COMPUTING

CROSS REFERENCE TO RELATED APPLICATION

This is a continuation-in-part of application Ser. No. 08/602,386, filed Feb. 16, 1996, which issued as U.S. Pat. No. 5,742,778, and which is a continuation of application Ser. No. 08/113,790, filed on Aug. 30, 1993, now abandoned.

BACKGROUND OF THE INVENTION

1. Field of the Invention

The present invention relates to an event-driven application sharing mechanism and, more particularly, to a graphical user interface that enables window events to be controlled and used among multiple unrelated single-user applications in a concurrent computing engineering context.

2. Description of the Related Art

Although graphical user interfaces (GUIs) have improved over the years, they are still predominantly based upon a single-threaded dialogue. In a single-threaded dialogue, a user operates on one single command button to invoke one application or to execute one single function at a time. These buttons typically are part of a window of a conventional windows environment and appear on a screen display of a computer system.

In a conventional remote computing environment, a host computer is coupled to remote computers. Each remote computer is able to run a sequential application. Each of the sequential applications contained on the remote computers produce an application window on the host computer. The user typically resides at the host computer and interacts with the sequential applications via each of the host application windows. Each application window enables the user to input commands or data for the corresponding sequential application or to receive information back from the corresponding sequential application. The commands or other information are passed back and forth to/from the remote sites from/to the host site using known communication protocols, such as UNIX Sockets.

In a standard client-server model, the display on the host computer is the server, and the sequential applications are the clients. The screen display of the host computer can serve the clients on any system in a network. The remote clients are able to display their windows on the host screen display when the display of the host computer (server) gives them the access authority.

Typically, as soon as the user types a character or presses a button on a window, the window event is delivered by the server to the appropriate application (client), the owner of the window. Input events are private to the application. All the events occurring on a window will be sent directly to the application. See, for example, Adrian Nye, "Xlib Programming Manual", O'Reilly & Associates, Inc. July, 1992.

Current sharing technology uses a pseudo-server to intercept (poll) and multiplex window messages from a server to applications (clients). This approach usually results in a heavy traffic load and a demand for high bandwidth network communication links.

Figure 1:
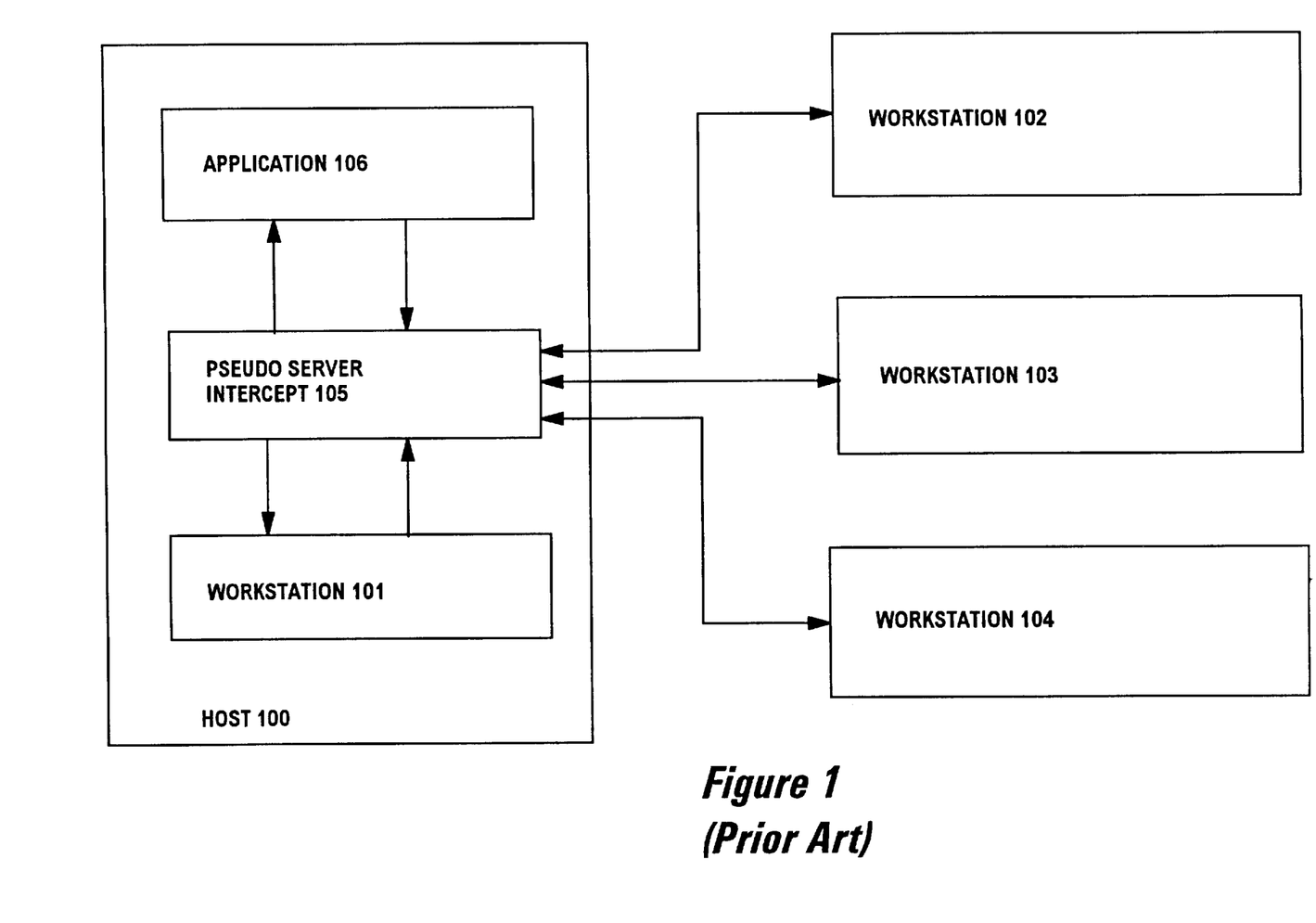
FIG. 1 illustrates a prior art collaboration system based on interception by a pseudo server.

As illustrated in FIG. 1, a common method used to permit the same application 106 (client) to share a window application among multiple workstations 101–104, is to use a pseudo server 105 to intercept existing application messages and pass them to each user's workstation 101–104, To the application 106, the pseudo server 105 appears to be the actual server. To each user's workstation 101–104, the pseudo server 105 appears to be the client. The data exchanged between the user application 106 and the pseudo server 105 is identical to the data exchanged between the pseudo server 106 and the user workstations 102–104. Because this approach constantly sends messages among participating workstations, it usually generates heavy network traffic.

SharedX is an example of a system that uses the server extension approach. SharedX extends the X window system to allow application sharing by replicating the X protocol stream for each of the target windows. See, for example, John R. Portherfield "Mixed Blessings" and "HP SharedX", HP Professional Volume 5 Issue 9. September, 1991. Because the X protocol stream has a relatively high bandwidth, this approach does not work well for large numbers of targets or for high bandwidth applications, like video or manipulation of 3-D models.

There are significant limitations to pseudo-server or extended server types of approaches. Duplicating X protocol for each target window is a relatively high-bandwidth operation, effectively preventing real-time sharing of 3-D rendering or multimedia applications over networks. Under such a scheme, PHIGS (Programmers Hierarchical Interactive Graphics System), PEX (PHIGS Extension to X Window System - - - providing 3-D graphics support) and proprietary graphics based applications are not supported. Another drawback is that Direct Hardware Access (DHA) applications bypass the X server. As a result, one cannot share real-time rendering modeling.

An alternate prior method uses a separate simulated control window to multicast input events and thereby control concurrent applications. See, Ming C. Hao, Alan H. Karp, Vineet Singh, "Concurrent Application Control in Collaborative Computing", HPL-94-37, April, 1994. Under this scheme, a control window is used to simulate the application window. With this mechanism, any private window events, such as button press/release, key press/release, and cursor motion, can be accessed and distributed among multiple shared applications. This scheme overcomes the repetitive entry problem of the private window approach which required simulation of each type of window input fields (e.g., button, text field) for each application, and also the inability of private window approaches to multicast window events to existing graphical user interfaces of program applications without interpretation. The mechanism can handle multicasting to different application programs, dynamically control grouping, ordering or sequencing of window events, and permits multicasting of the window events to nearly simultaneously invoke different action types or operations in same or different GUI layers. Furthermore, the separate control window approach permits access to existing GUIs at run time without requiring any changes to the source code of either the program applications or their GUIs. Therefore, no recompilation, relinking or special libraries are required.

In any case, the above-described known techniques suffer from major disadvantages. They are ill-suited to provide advanced collaboration software features or an infrastructure for concurrent engineering design and other applications. They do not permit one to run existing applications unless commands are entered to a special, custom designed control window. They also do not allow engineers and designers working together to share massive volumes of data and collaborate over low bandwidth communication networks (e.g., 56 kbps lines, Internet).

Thus, there is an unresolved need for a flexible low bandwidth concurrent sharing mechanism that does not require recompilation or modification of the windowing language. The mechanism should permit users to come and go and should be usable over multiple window systems and by multiple applications.

SUMMARY OF THE INVENTION

The invention is a method and apparatus that provides a new technology and infrastructure to permit real-time sharing of existing distributed applications based on capturing and multicasting window input events.

The user interface enables sharing of many single-user, non-modified applications between two or more workstations. It provides concurrent sharing of existing multiple applications with no change in a distributed environment. It permits real-time sharing of distributed applications based on a fundamental window hierarchy mapping and user input event capture. Control is centralized but the data and program are replicated. It is event driven with agent assistance.

This mechanism is built on the window hierarchy structure of the applications. The mechanism uses active window entering, capturing and input event multicasting to distributed window events across different workstations.

The new event capturing capability is automatically triggered by user interactions on the shared window. The event capturing capability starts when the user moves the pointer into the shared windows. The event capturing ends when the user moves the pointer out of the shared windows.

The multicasting scope is defined in a shared window hierarchy data array. This global data array is dynamically created at run time on an as-needed basis. Because this mechanism only processes user input events (commands), no application data transmission across the network is required. Therefore, this approach is extremely light-weight and provides secure transmission without requiring intensive encryption. Because it is not using pseudo server interception, this approach can support 3-D rendering. Also, the agent can dynamically mediate resources and normalize environment differences. This permits real-time sharing of 3-D, graphic and DHA applications.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 2–9. Those skilled in the art will readily appreciate that the detailed description given herein with respect to these figures is for explanatory purposes, however, because the invention extends beyond these limited embodiments.

The invention concerns a mechanism, Inter-Access Event Process (IEP), that provides a generic input event capturing control and distribution technology among multiple servers and clients during a concurrent computing session. IEP enables users to control and use window events of any applications. It captures application window events from: window tree hierarchy mappings, user interactions on the windows and enter/leave window events. It differs from prior pseudo-server (interception) methods by not using a control window to simulate the application windows and thereby collect window events to multicast. With this new feature based on window event mapping and window (enter/leaving) event capturing, any private window events/states, such as button press/release, key press/release, or pointer motion, can be accessed and distributed among multiple shared applications after being captured directly from a window of one of the applications. It is also different from the traditional method of using a pseudo server interception scheme to intercept (filter) events/messages between the display (server) and clients (applications). The mechanism maps window structure, captures user interaction on the window and multicasts these events to a selected set of application windows to execute operations concurrently. In accordance with the invention, an existing sequential application can be made distributed with no modification to the existing system or application software. The term distributed as used herein is broadly defined as including both a distributed computing environment and a multitasking environment. Distributed computing classically refers to separate programs being executed on different computers or workstations, while multitasking refers to separate programs being executed on the same computer or workstation.

Any application program running under a graphical user interface (GUI) that captures user events such as button press/release, key press/release or pointer movement can be run using the invention without change thereto. For consistency, in the following discussion, embodiments employing the X windowing system will be described. It is to be understood, however, that alternate embodiments can employ other GUIs, for example, the popular Windows, Macintosh, Motif or OpenLook interfaces.

Figure 2:
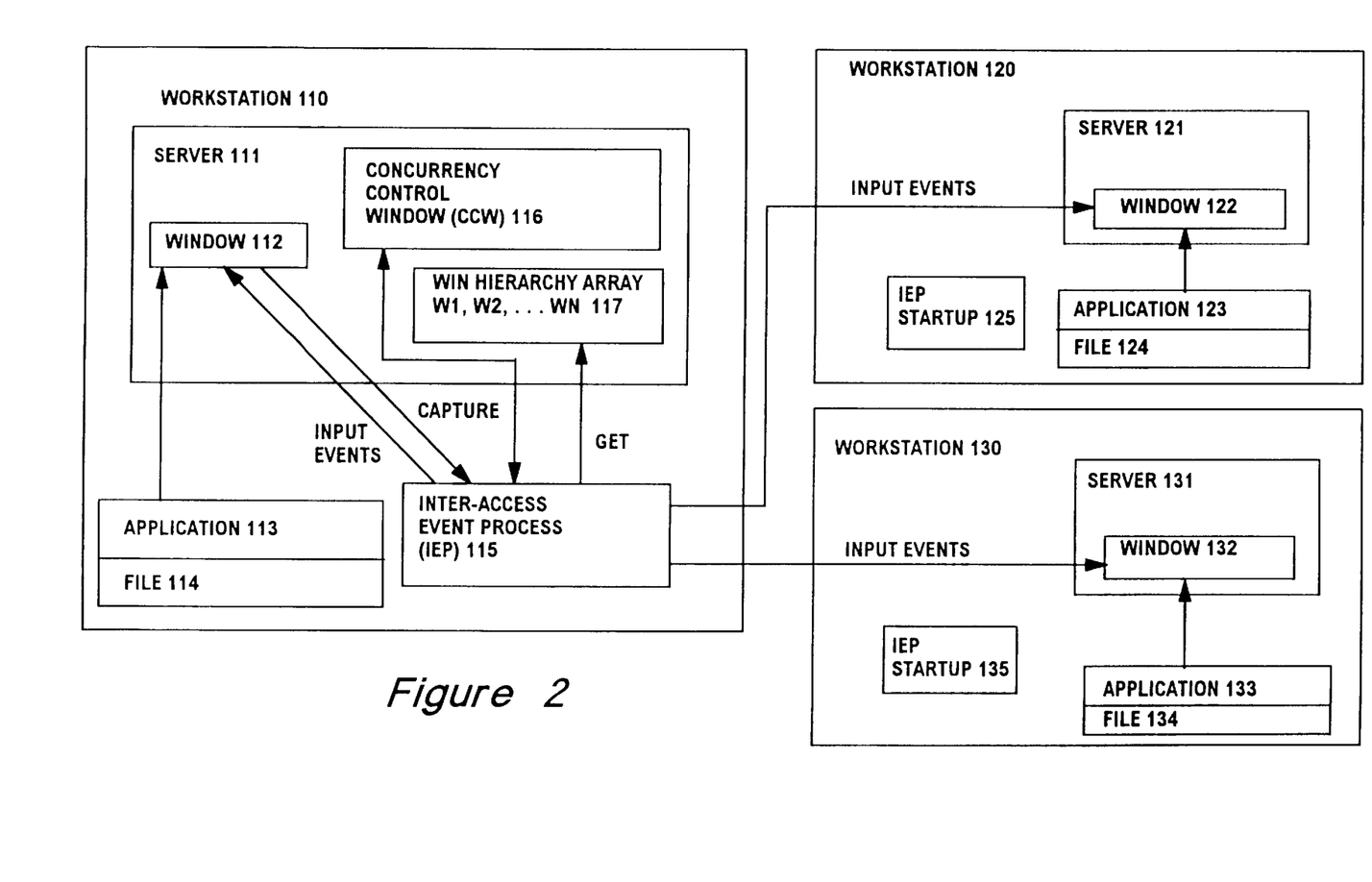
FIG. 2 illustrates a multiple workstation system using collaboration software.

FIG. 2 illustrates an embodiment of a multiple workstation system using collaboration software. In FIG. 2, workstations 110, 120 and 130 are separate workstations possibly located at different locations. Thus, all workstations can be located at the same location, or the workstations can be separated by great distances. Each workstation is running a local application having at least one locally displayed window associated with the application. Each application also operates on a local workstation to determine what is displayed in the associated local window. The concurrency control window 116 of workstation 110 permits a user of workstation 110 to select which of the other workstations will receive multicasted events captured by the Inter-Access Event Process (IEP) 115 as they are entered in window 112.

An example of how this IEP mechanism can be used is in the field of collaboration. IEP allows engineers or researchers located at remote sites to view and manage shared applications among multiple workstations. Unlike the prior high bandwidth approach such as SharedX, IEP replicates only the input events among applications running on distributed computers to thereby perform desired functions. This provides application sharing through multiple, synchronized instances of the shared application.

In a simple case, identical copies of a CAD/CAM (computer aided design/computer aided manufacture) program and a database file can be resident on each workstation. A user working on a design at workstation 110 can press a button, move a mouse or type a key into window 112. The user's action will be captured by IEP 115 and multicast to windows 112, 122 and 132. Applications 113, 123 and 133 then apply the same user action to respective files 114, 124 and 134 and display the result in respective windows 112, 122 and 132. For example, a rotation motion (to cause a 3-D figure to be rotated a certain amount) can be conducted directly on window 112. The rotate motion would then be captured and multicast to windows 112, 122 and 132. Each application (113, 123 and 133) would receive the motion event and operate on an associated local database (114, 124 and 134, respectively) to determine and display the rotated figure.

Although the same figure would be displayed on each workstation, there would be very little information transmitted between the workstations. Only the rotation motion input event would be multicast. This capability permits the engineers to collaborate across great distances using low bandwidth transmission lines. Furthermore, rather than requiring that the input event be entered into a special window, it is entered as a direct input event into the application window. There is no interception processing performed on the contents of the input event. Another example of the use of IEP is to provide automatic updates and replications to spreadsheets, documents and databases. With the capability of sharing the same input events, IEP triggers the corresponding applications to update or replicate multiple database copies with different contexts spreadsheet/database/documents simultaneously. As will be described further below, one can also use this input event sharing technology to build interactive games and to provide many other multimedia interactive applications.

IEP Features

IEP provides a mechanism to access, control, and distribute private input events directly from/to the application windows with a plurality of processes interacting concurrently. The IEP mechanism uses the combination of active window entering, capturing, and input event multicasting to distribute window events across different workstations or systems.

The IEP mechanism permits a user to access private window events directly from the application window. It allows applications to share events among different systems/computers. This is accomplished without requiring changes to the windowing system or to the application to be shared. Thus, IEP provides a portable, easy to use, and fast mechanism to share input events among multiple applications.

IEP is built on a multiple client, multiple server model. For one embodiment IEP uses standard X window, MOTIF interfaces to access existing application window input events and distribute them among multiple applications.

IEP is the main inter-access event process. It resides in the workstation which captures and multicasts the input events to the remote application windows (e.g., Workstation 110 in FIG. 2).

The IEP_StartUp program resides on each workstation. The main functions of IEP_StartUp are to: collect the application window information; send the information to IEP; and store the information in WinDataArea 117 of Server 110 in FIG. 2.

In FIG. 2, the IEP_StartUp program 125 and 135 resides in workstations 120 and 130. These programs store the application window hierarchy information of each display sever in the WinDataArea 117 on Server 110.

The main functions of IEP include: (1) mapping application window hierarchy information for window 1–n from the WinDataArea to build a window inter-access window hierarchy array; (2) entering the application window and capturing private window events, such as button press/release, key press/release, pointer motion . . . , from application windows when the user's mouse enters the window; and (3) multicasting the incoming events to windows 1–n.

For example in FIG. 2, IEP 115 (1) maps window information from the Win DataArea 117; (2) when the user's mouse enters display 1/window 112, IEP 115 captures an event from display 1/window 112; (3) based upon the window hierarchy array, IEP 115 multicasts the event to display 1/window 122 and display 2/window 132 (in general, to display n/window m). Afterwards, IEP 115 may enter display 2/window 132 and capture another event from display 2/window 132; IEP would then multicast the second event to display 1/window 112, display 2/window 132, . . . and display n/window m.

Before the input events are sent to application windows 1–N, IEP analyses the events from multiple applications and puts them in proper execution order. Optionally, IEP can replicate the event stream or tailor it for some targets to allow for different key codes, colormaps and the like.

Three main functional blocks of IEP are as follows: Inter-Access Resource Table Creation; Event Capturing and Notification; and Event Multicasting and Event Sharing.

In the case of Inter-Access Resource Table Creation, IEP retrieves the shared application window tree hierarchy data array information from the WinDataArea. It also creates the inter-access resource table that contains the global window hierarchy structure mapping for all shared applications for input event capturing and multicasting.

In the case of Event Capturing and Notification, IEP captures the private events from the shared window under control of a pointer movement entering/leaving the shared window. After IEP captures the shared application window pointer, all the selected private window events, such as button press, release, motion notify, . . . , will be reported to the IEP. IEP defines various types of event handlers to process each incoming event.

In the case of Event Multicasting and Event Sharing, IEP provides a grouping function to allow users to select the input event distribution scope. It provides an ordering function to sequence events from multiple sources into a proper execution order. It also provides a multicasting function to distribute events to the appropriate targets based on the global window hierarchy data array. After analyzing the captured input events, IEP orders them if necessary and sends the shared input events to the target application windows. Applications automatically trigger their own event handlers to execute received events. Events are processed just as they would be if the window events had been directly entered into the application windows.

Although only one concurrency control window is depicted in FIG. 2, multiple concurrency control windows can be employed to permit floor control among the users of the various workstations. In an embodiment wherein each workstation has its own concurrency control window, each user can enter commands into the screen of the workstation for that user.

Figure 3A:
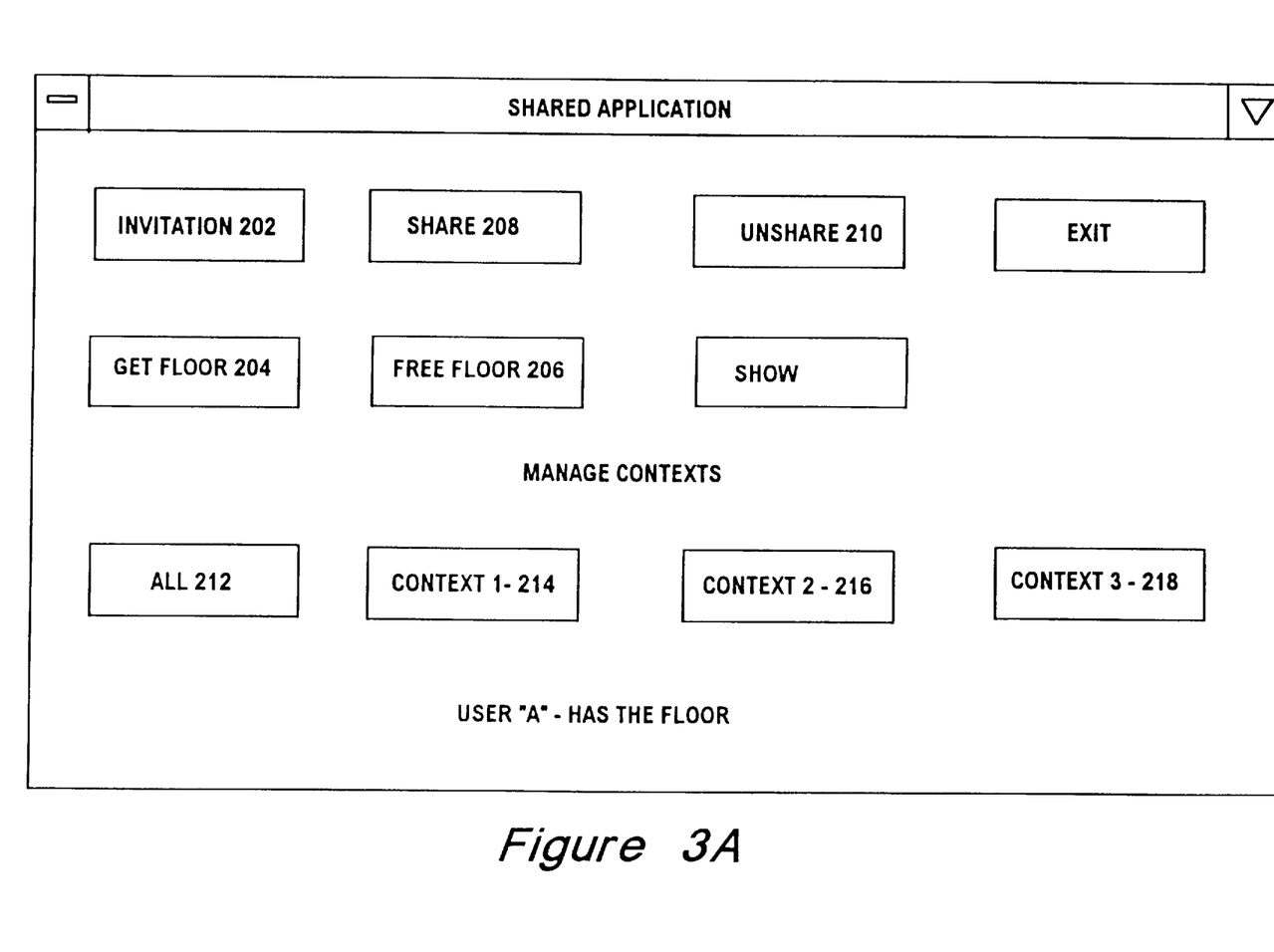
FIG. 3A illustrates an embodiment of a concurrency control window graphical user interface.

FIG. 3 illustrates an embodiment of a concurrency control window graphical user interface. IEP real-time collaboration provides a symmetric, multi-user, multi-application session. There is only one single input source. It is managed by a central floor control mechanism. Each concurrency control window is managed by the floor control mechanism. Only one user can have the floor at a time and enter events. The invitation button 212 is used to invite a user to join a shared session. The initiator: enters the workstation name of the participants, enters the shared application name, issues an invitation letter and starts video conferencing. Participants then reply to the invitation (by entering id, yes/no, etc.) and use the conferencing control window to join the application sharing. This permits synchronized views. Furthermore, ease of use is provided because, as is the CAE in applications such as SharedX, one merely clicks on a window to begin sharing.

The get floor 204 and free floor 206 buttons are used by the users to pass control of the sharing among themselves. A user desiring to have the ability to capture and multicast events requests the floor by clicking on the get floor button 204. The user having the floor can then relinquish the floor by clicking on the free floor button 206.

The context buttons (212, 214, 216 and 218) permit the user having the floor to select the context and thereby determine to whom the captured events will be multicast. One can add shared windows through a mouse click. One can also construct the shared window data area and query the pointer/window tree. Thus, for example, context ALL (212) could cause events to be multicast to all users, whereas contexts 1, 2 and 3 would only multicast to respective subsets of all of users.

The share 208 and unshare 210 buttons permit the user to dynamically select a window to share. IEP will ask all the agents to send the local window hierarchy array to IEP, and to map data arrays into a global window hierarchy based on user's needs. A user can enter a local mode whereby events entered will not be multicast. In the local mode the user can perform operations on the local application without relinquishing floor control.

Figure 3B:
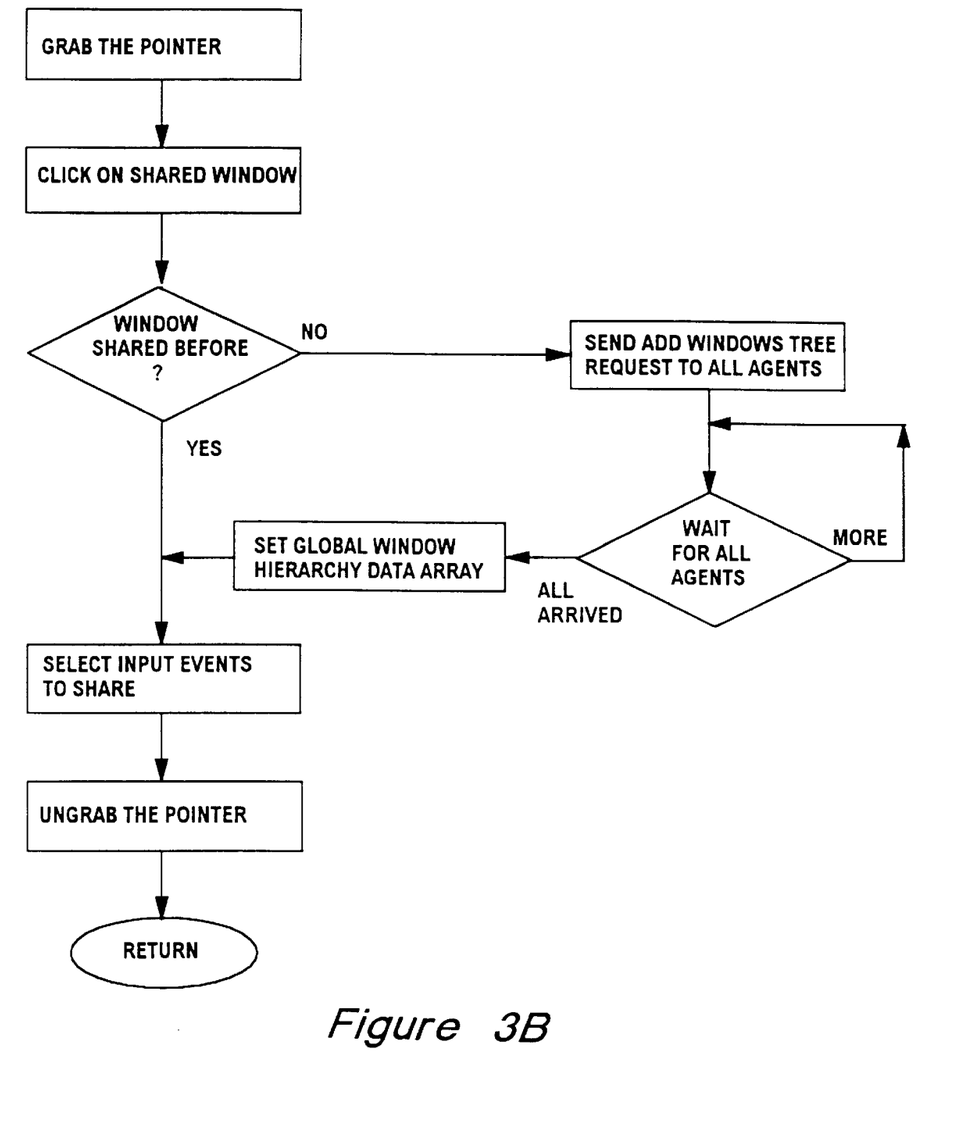
FIG. 3B is a flow chart illustrating window hierarchy mapping in the share window.

FIG. 3B is a flow chart illustrating window hierarchy mapping in the share window. This corresponds to the share button of the concurrency control window or FIG. 3A. As illustrated in FIG. 3B, IEP grabs the pointer and a user clicks on the shared window. If the window has been shared before, then the input events to share are selected before the pointer is released.

If, on the other hand, the window has not been shared before, add window tree requests are sent to all participants (agents) that are sharing. The process waits until all of the participants have replied and then the global window hierarchy data array is set using the information from the participants.

Figure 3C:
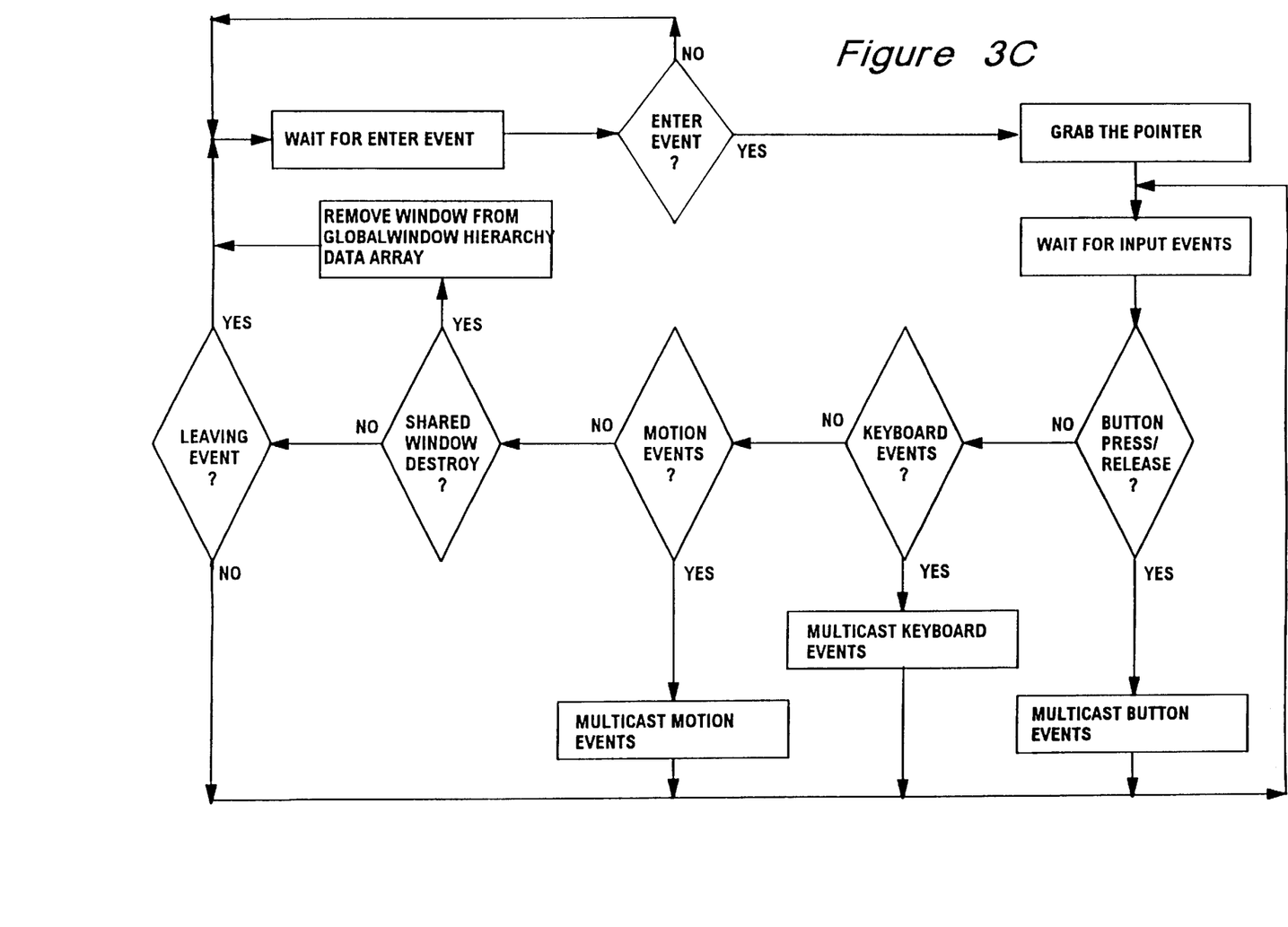
FIG. 3C is a flow chart illustrating application sharing with user interactions.

FIG. 3C is a flow chart illustrating application sharing with user interactions and describes concurrency control window input focus. IEP waits for an enter window event. When the window is entered, IEP grabs the pointer and then IEP waits for input events.

Upon receiving button press/release, keyboard or motion events, IEP multicasts the events to all participating applications and then waits for more input events. Upon receiving a shared window destroy, IEP removes the window from the global window hierarchical array and then waits for another enter event. Upon receiving a leaving event, IEP waits for another enter event.

Figure 4:
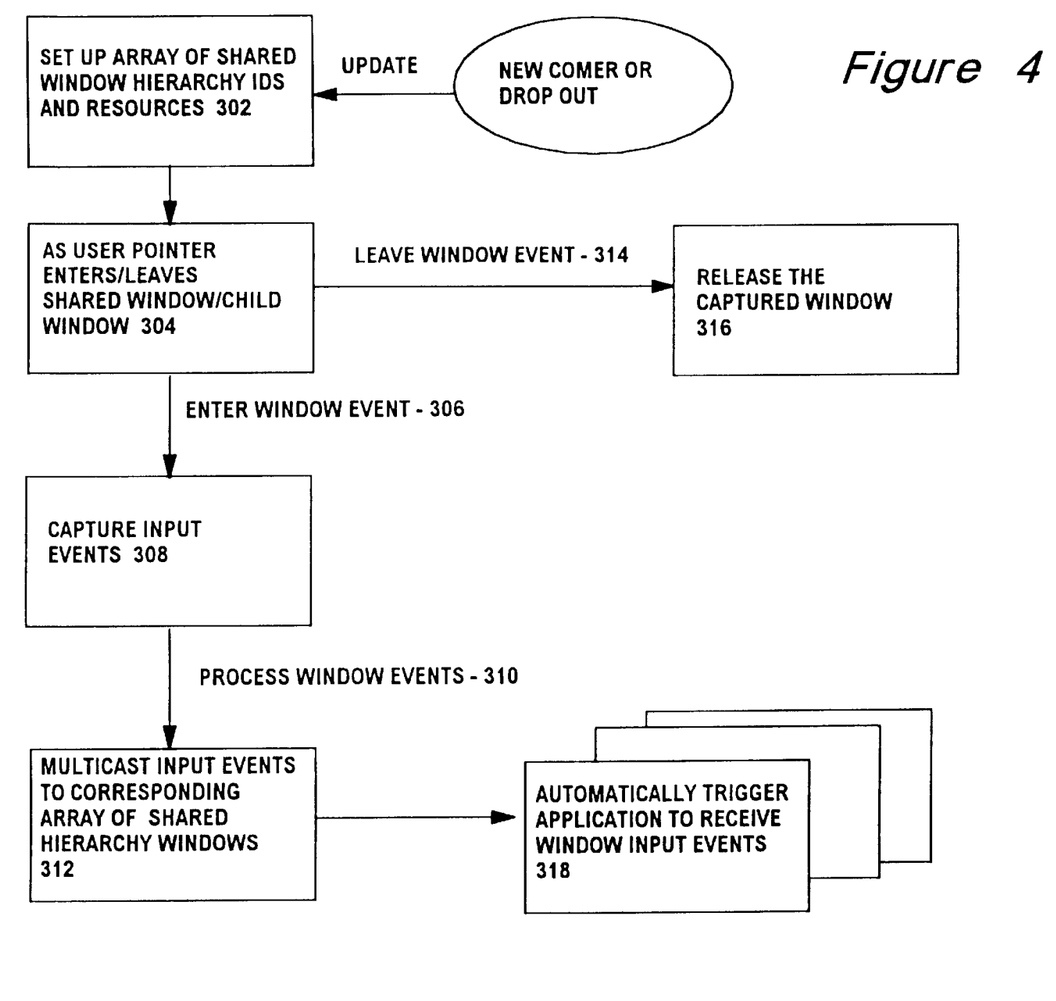
FIG. 4 illustrates high level flow for input event capturing.

FIG. 4 illustrates high level flow for event capturing processing flow used for concurrency control of multiple application execution. An embodiment having automatic window sharing and unsharing is depicted. An array of shared window hierarchy Ids and resources is maintained (302) for app[i], child[i]. Different things happen as the pointer enters and leaves a shared child window (304). When the user moves the pointer into the shared window and performs an action (e.g., motion, button press, key entering, or leaving, the window), it sends an input event (306), the input event is captured by IEP (308) and processed (310). Then, the processed input event is multicast to all shared windows (312) and the associated applications are invoked (318). Alternately, when the pointer leaves the shared window (314), the captured child window is released (316). No event will be sent to IEP.

Capturing removes application specific information such as buttons that are used for button events. A text field is used for key press/release events. IEP provides generic window sharing. Share begins when a shared window is entered and ends when the window is left. That shared window may be a button or text field.

The IEP child window data area uses information from the shared application window tree structure. Its purpose is to find corresponding application window ids, characteristics and child windows. One can use a mouse to click and thereby to dynamically add an application window to a working task set. A series of query window child/parent relationship protocols are used to find application window structure and their child windows (buttons, text fields, and the like). One can map (i.e., build relationships) for shared application windows by building ChildWinDataArea for event capturing and multicasting.

The IEP process logic is driven by events such as mouse, keyboard or cursor movement events. The dynamic shared window data area is an array of shared window/child window Id mappings for app[i], win[i]. Setup is used to update new comers and dropouts. As the pointer enters and leaves a shared window or child window various things happen. When an the user's mouse enters the shared window, the input events are captured and will be sent to IEP rather than to the client that would normally have received the event. Input events are then multicast to all shared windows. An input event will not be captured when the user's mouse leaves the shared window. Leaving an event causes captured shared windows or child windows to be released When the user moves the pointer out of the shared window, sharing will be ended.

Generic application sharing control provides a framework for application sharing management of real-time 3-D modeling, PHIGS, video, and the like. It provides: generic window input, multiple applications sharing, and permits environmental difference (e.g.,size, font, color).

Figure 5:
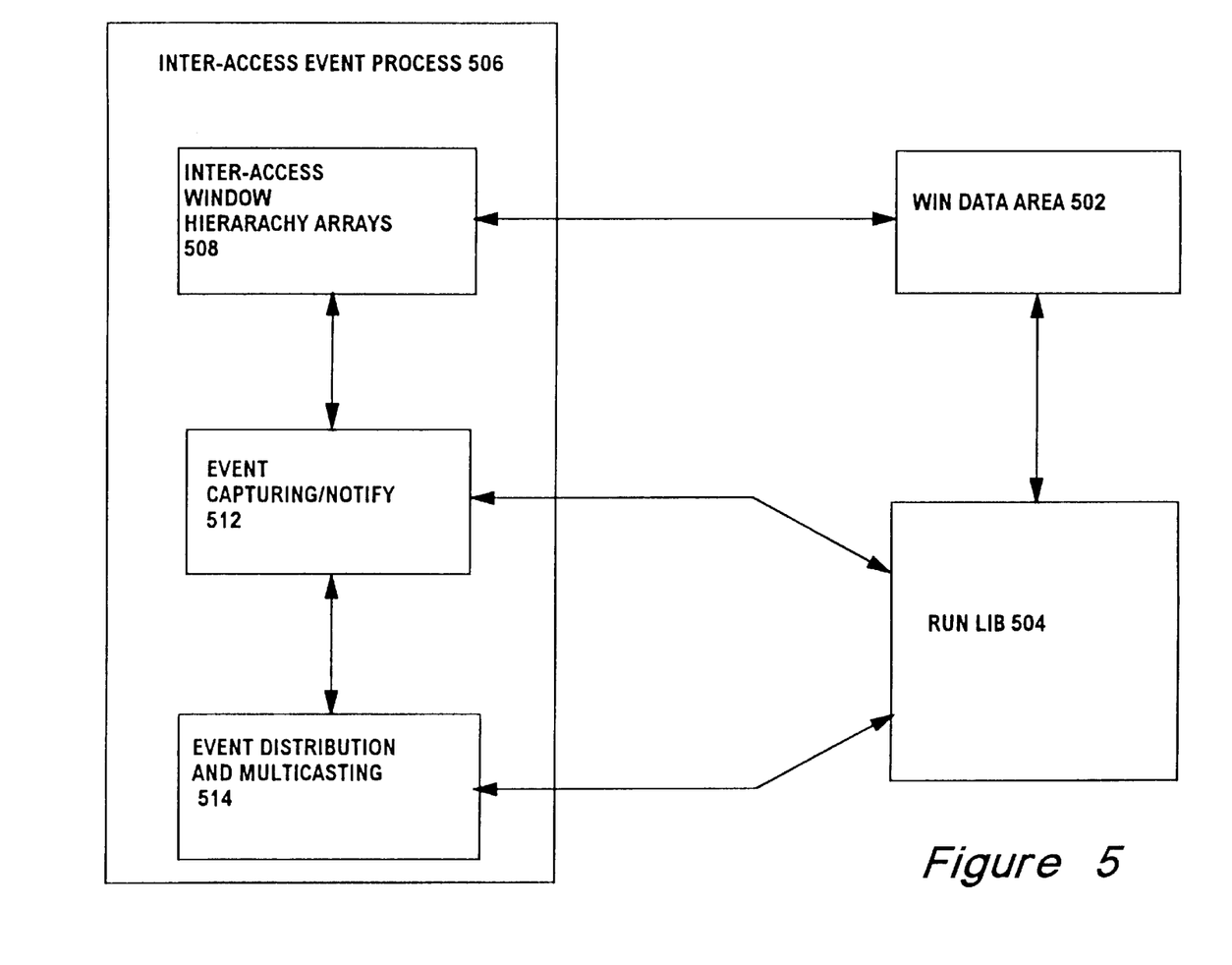
FIG. 5 illustrates the interaction among an embodiment of the Inter-Access Event Process, the Window Hierarchy Array Data Area and the Run Lib.

FIG. 5 illustrates the interaction among Inter-Access Event Process 506, the Window Data Array 502 and the Run Lib 504. Included in Inter-Access Event Process 506 are inter-access resources table 508, event capturing/notify 512 and event distribution and multicasting 514.

IEP 506 is a mechanism that is built on a multiple client-server model. The mechanism is built on a basic window hierarchy structure and contains event mapping and capturing components. The application sharing technology is achieved through a fundamental window tree mapping and user interaction.

The approach is to access, control and distribute input events automatically triggered by the user interactions on the application window. Instead of using the pseudo server scheme to intercept (filter) window messages, we use the fundamental window system structure and a concurrent event control mechanism to map 508, capture 512, and multicast 514 window events.

Using window hierarchy structures instead of window attributes, IEP incorporates a way to automatically map a window located at one site to windows located at other sites that correspond to the same position in the window hierarchy. IEP communicates with each agent residing at different workstations to construct various instances of the one-to-one parent-child window mapping.

Figure 6:
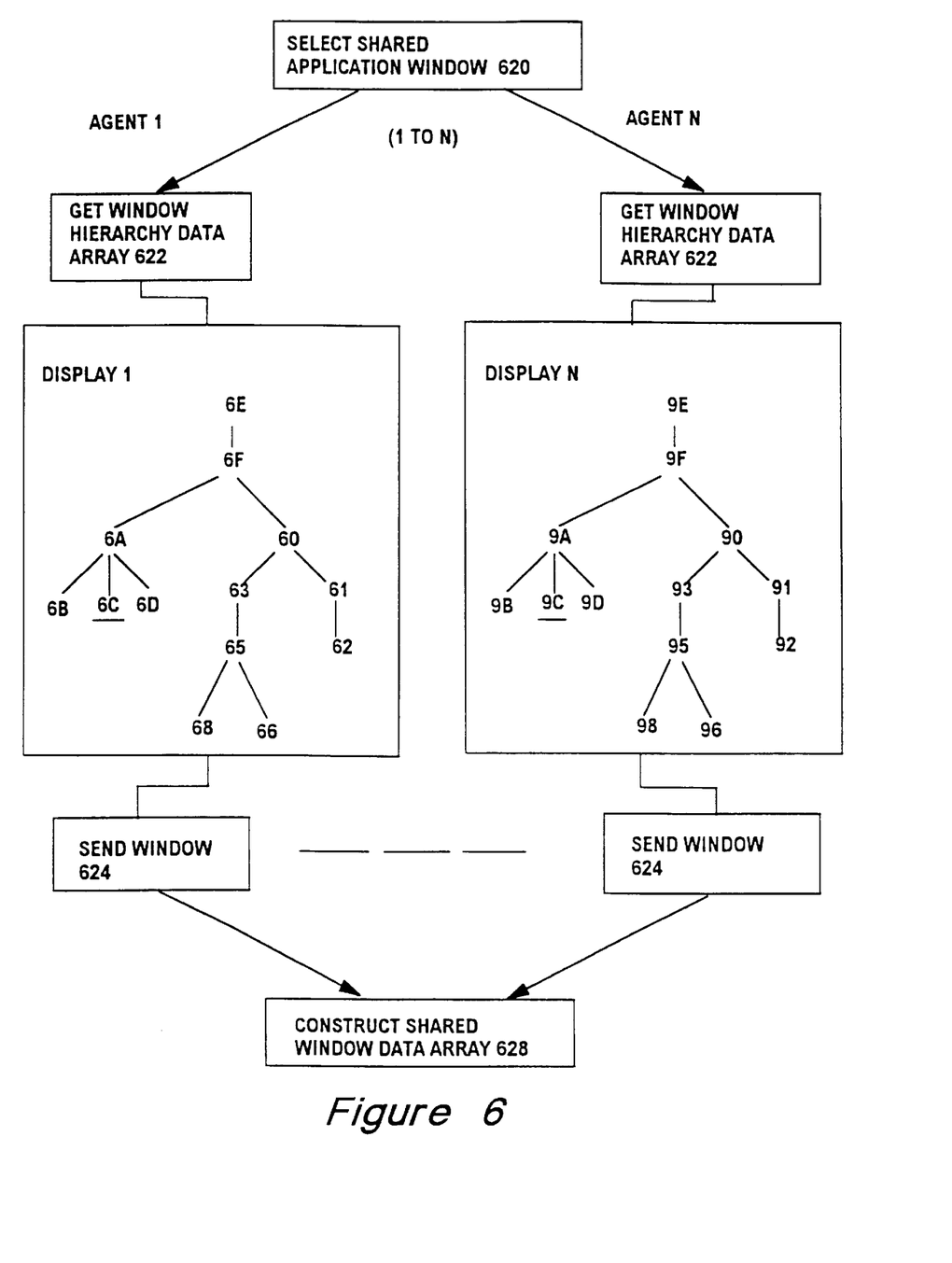
FIG. 6 illustrates parallel processing used to construct a shared window hierarchy mapping.

FIG. 6 illustrates a generic window tree mapping from the window at display 1, . . . , to display N. When the user having the floor selects a shared application window (620), IEP gets (622) the window hierarchy data array information for each application window being shared (624). The window hierarchy data array for each shared application is sent (624) to IEP so that IEP can then construct a shared application window data array (628).

For example, the child window 6C of display 1 is mapped to child window 9C of display N. When the user processes the window at 6C, the input event will be concurrently multicasted to the corresponding child window 9C. Thus, if the window at 6C is a button, then a button press event will be triggered at window 9C when the window 6C button is pressed.

Although symmetric window hierarchies for the displays are shown in FIG. 6, this need not be the case. Thus, for example rather than mapping the child window 6C of display 1 to child window 9C of display N, one can map child window 6C of display 1 to child window 98 of display N. This mapping can be accomplished even though 6C and 98 are radically different windows having radically different attributes.

Figure 7:
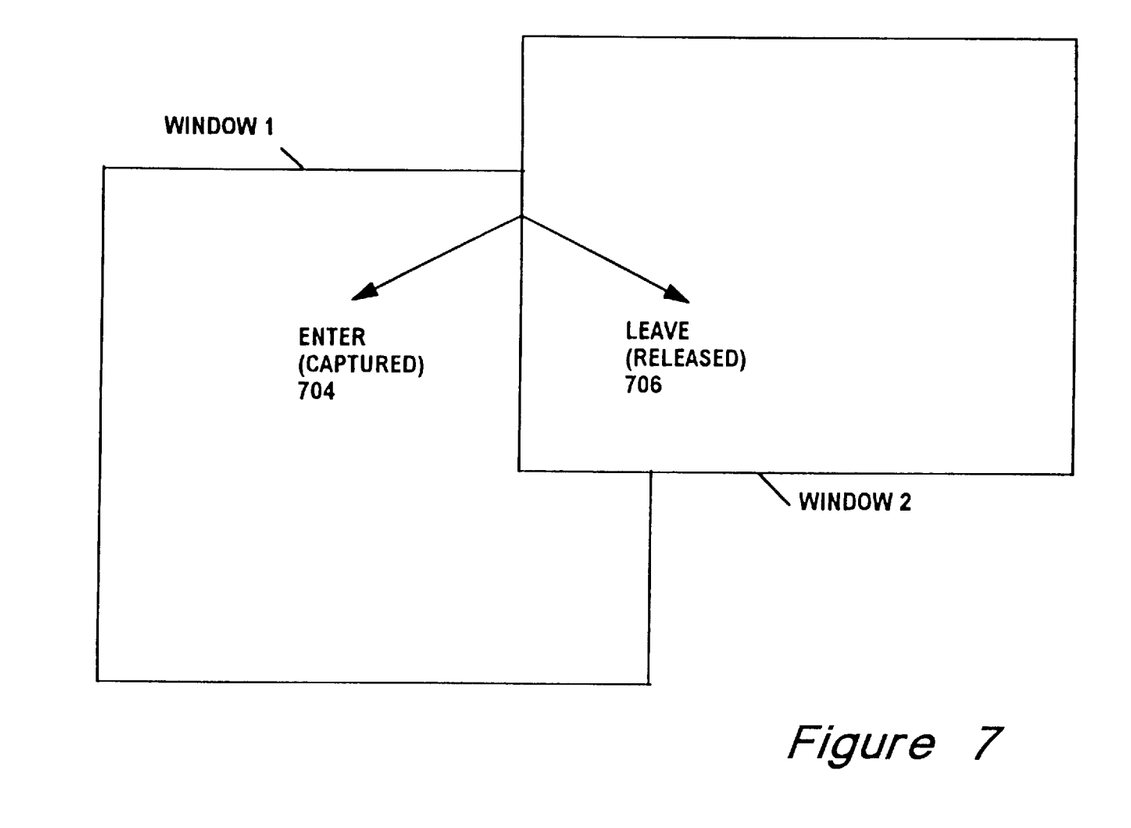
FIG. 7 illustrates automatic dynamic window events capturing as a pointer enters and leaves a window.

An IEP event capturing process is shown in FIG. 7. The input events are captured when the user moves the pointer into the shared window. An event from the pointer, key or button is sent to IEP rather than to the client that would normally have received the event. IEP processes the event and then multicasts the event to the appropriate shared application windows, thereby causing functions associated with the event to be executed concurrently.

In contrast to the pseudo server interception mechanism that has been used to share applications, IEP uses a new event capturing mechanism to share existing applications without modification. As illustrated in FIG. 7, IEP captures window input events on window 1 when the user's pointer enters (702) window 1. The event capturing from window 1 ends when the user's pointer leaves window 1 (704).

An IEP event processing session builds on a standard window inter-client communication (e.g., an X window client communication). Session management and floor passing are handled in IEP using a six part structure: define IEP_agent communication, the IEP window hierarchy data array, IEP_Lib, session management, shared/unshared applications and floor controls.

Define IEP_agent communication is used to initiate connect and define shared atoms. It also includes IEP_Connect that builds the share control window and defines communication atoms/windows. Thus, define IEP_agent communication initializes the IEP window hierarchy data array shared atoms, windows and resources.

The IEP_Lib is used by session management, shared/unshared applications and floor control sections to update the IEP window hierarchy data array. Thus, IEP_Lib is the IEP runtime library (i.e., Run Lib 504 of FIG. 5). It contains various protocols for window initiation/allocation/association, and event capturing/multicasting.

For example, an embodiment of IEP_Lib contains the following components:

IEP_INIT: to initialize a shared application session.

IEP_DATA: to construct an inter-access multi-window data area.

IEP_ENTER: to enter a shared application window.

IEP_CAPTURE: to capture shared application window.

IEP_MCAST: to multicast input events to shared applications.

Session management is used to establish a session and provides support for multiple sessions. An embodiment of session Management includes: SCW (session control window), receive service (invitation), IEP_Bulletin (open communication windows), IEP_App and IEP_Exit.

Floor control provides focus change. Floor control handles one single input source; IEP_GetFloor/IEP_FreeFloor; an explicit basic floor control mechanism and open floor policies.

Finally, the shared/unshared applications provide agent assistance for shared/unshared applications. This includes IEP_Capture of motion, key and button events; IEP_ESP for multicast, click/ease of use; and IEP_Visual to identify shared windows.

With regard to application programming interface (API), IEP library calls provide a runtime library 504 and are used for event capturing/multicasting/sync/session management and floor control. One part of IEP_lib is IEPShareWin/IEPShareApp that is made up of IEP_Button, IEP_Motion and IEP_key to handle button, pointer and text, respectively. Also part of IEP_lib are: IEP_agent (session), IEP_connect (atom), IEP_floor (getFloor, freeFloor, time), IEP_Capture (private win event), IEP_getWin_sendWin (event proc), IEP_sync (make views consistent) and IEP_VisualCue (ease of use).

Figure 8:
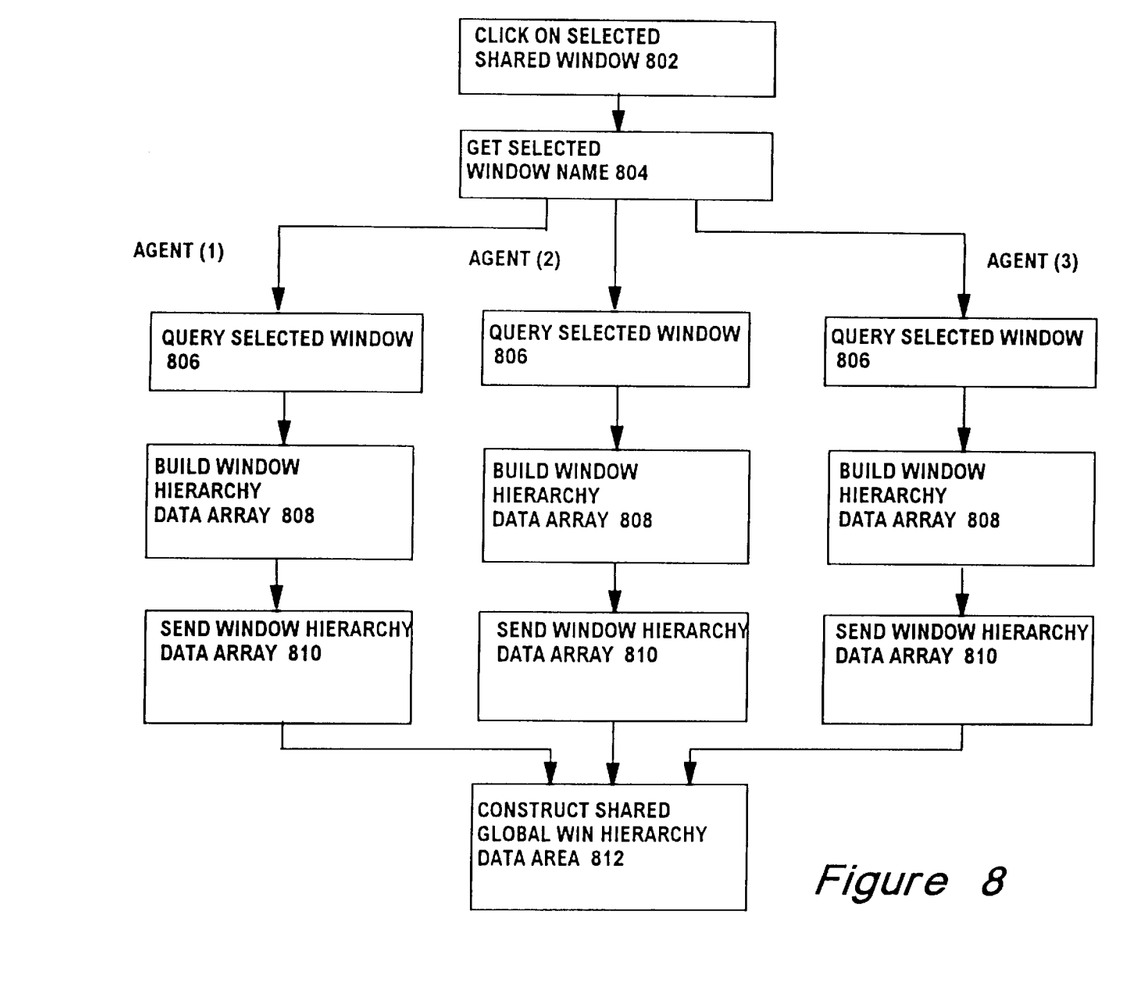
FIG. 8 illustrates window event mapping used to construct a global shared window data area.

FIG. 8 illustrates parallel actions used to construct a shared window data area. Generic window capturing begins with a click on the select shared application window button 802. This, in turn, causes the retrieval of the selected window name 804.

Assuming three agents, the three agents will perform the following actions in parallel: query select window 806, build window hierarchy data array 808 and send the window hierarchy data array 810 to IEP. The shared win data area will then be constructed by IEP from this information 812.

Figure 9:
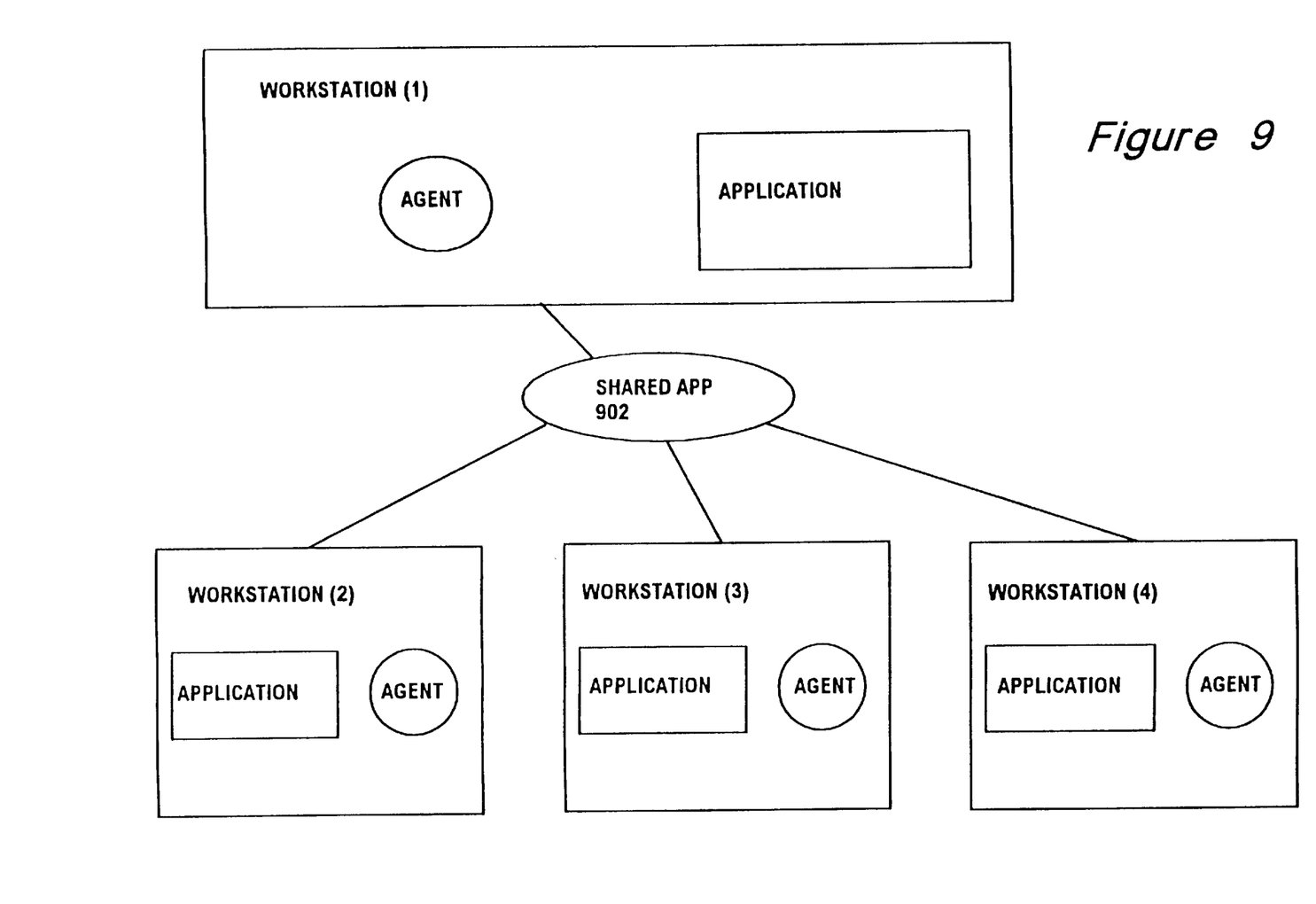
FIG. 9 illustrates an alternate embodiment for a multiple workstation collaboration system wherein agents are employed at remote stations.

FIG. 9 illustrates an alternate embodiment for a multiple workstation collaboration wherein agents are employed at remote stations. Thus, IEP can be extended from a centralized IEP (illustrated at FIG. 2) to a distributed IEP. The overall distributed architecture is shown in the FIG. 9. The IEP 902 has a session manager to map input events, capture input events from multiple application windows, put them in proper execution order (based on floor control policy), and then multicast them to each corresponding application window. The advantage of using a distributed IEP operation is that causing remote event capture to be performed locally further reduces network traffic. Also, each local agent can mediate any environmental differences.

Regardless of whether or not IEP is distributed, IEP also permits application window event mapping. That is, IEP makes it possible for events typed in an application window to be multicast to other windows which may be owned by another instance of the same application with identical window structure, another instance of the same application with different window structure, or a completely different application. The first situation can be called a "homogeneous" environment; the last, "heterogeneous". The middle case then becomes "semi-homogeneous". In all three cases, there are times when it is important for the user to be able to control the mapping of the window objects to those on other windows. In a heterogeneous environment, one must connect different fields together. For example, when a user pushes the "execute" button on one window, the "go" button will be pressed on the window of another application, and the "run" button on a third.

One may also need a mapping in a semi-homogeneous environment where there are different versions of the same application being used. For example, the version running on a workstation made by one manufacturer may have the buttons at the top of the window while the version on a workstation made by another manufacturer has them at the bottom. Or, a newer release of the same application, may have combined the functions of two button presses of a previous version into one.

Even in the case of a homogeneous environment, one may need the mapping function. In the case where windows are sized differently, a click on one button will cause similar clicks to be multicast. This can be done because IEP maps the button child windows, rather than mapping screen pixel locations.

More elaborate mappings can be made. Consider an interactive game, say a tank battle. This game falls into the set of homogeneous applications because each player views the same window configuration, even though the battlefield views will be different.

Some buttons should be mapped to all instances of the game, for example, "Time Out". When a player presses the "Fire" button, however, that player does not want the "Fire" button on the window of an opponent to be pressed. Other mappings may be of interest. For example, when a player locks a "Guided Missile" onto an opponent, the other player may wish to have a "Radar Lock" indicator turn on. IEP allows one to provide all these functions without sending specially constructed messages among instances of the game running on different computers.

IEP incorporates a mechanism to map an object in one window to an object in another window. One way to implement the mapping function is for IEP to read a file during start-up that describes the meaning of each object in the application window. Various instances of IEP then communicate this information to each other to provide the complete mapping.

This file can be created in a number of ways. One way is for a person to create the file manually. For example, when writing a game program, the programmer will know which buttons get shared, which are not shared, and which turn certain events on and off in windows of other players. This file may have a format like

| Buttons: | "Tank Battle" | |
|---|---|---|
| Function | Label | Scope |
| Shoot | Fire: | Local |
| Pause | Time Out: | All |

In other situations, one may wish to create the mapping interactively. In this case, the user of the applications may bring up windows and invoke an IEP Map-Window function. The user would use mouse clicks to connect together those buttons that are to be pressed simultaneously. A sample sequence might begin with the user clicking on a button labeled "Map object". The user would then click on an object in one window and then click on a corresponding object in another window. Finally, the user would click on a button labeled "End mapping". The IEP Map-Window function would then create a file with entries describing the mapping.

For example, the file for two versions (i.e., versions 1.0 and 2.0) of the same program might have entries like:

| Buttons: | Version-1.0 | Version-2.0 | |
|---|---|---|---|
| Function | Label | Label | Scope |
| Input | Read File | Read File | All |
| Output | Save File | Save | All |
| Save/Quit | — | Done | All |
| Quit | Cancel | Quit | All |

In this notation, when a user presses "Done" in Version-2.0 of the program, IEP would send the events for "Save File" then "Cancel" to Version-1.0.

After this file exists, it can be read by IEP upon application start-up just as though it had been created manually. The instances of IEP can then associate the buttons on these applications using the information in these files.

These examples of the contents of the configuration files are illustrative only; other mechanisms to describe similar function are possible.

Thus, it can be seen that IEP is the foundation of sharing applications among multiple workstations and can be used in many situations. It captures and multicasts events from the application windows directly without depending on simulated child windows, such as the buttons, text fields for event multicasting.

IEP broadens the usage of application sharing. Also, it removes server platform dependency. Therefore, IEP is portable. In addition, it is easy to use. The startup for IEP is very simple because it only requires the user to provide the names of the applications and workstations which the user wants to access. Furthermore, it permits a user to multicast commands that are input directly to the window of an application using the standard GUI of the application. This application sharing technology can assist real time remote consultation and collaborative work among users viewing same images and data sets. It also provides for high security in applications because of the use of window event capturing and multicasting to replicated servers and databases. There is no output data sent across the network.

IEP has application in many areas. For example, it can be used in concurrent engineering to permit the sharing of an unmodified CAD/CAM application or the sharing of 3-D modeling/rotation, for a multi-client, multi-server system. IEP can be used to simultaneously update different documents/spreadsheets from a single source. IEP can be used with a world-wide-web browser to permit the sharing of a HTML (hypertext markup language) document. It can be used as a video player to present real-time presentation by sharing video/audio (e.g., MPEG files). It can also be used as an interactive visualization debugger when performing distributed/parallel debugging of multiple clients of a single server.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An inter-access event protocol (IEP) graphical user interface for a windows computing environment, comprising:

means for capturing private input events; and means for multicasting the captured input events based upon a window hierarchical data array.

2. A graphical user interface as recited in claim 1, wherein the IEP handles motion, button and keyboard event capturing.

3. A graphical user interface as recited in claim 1, wherein the IEP provides generic window hierarchy tree creation and mapping.

4. A graphical user interface as recited in claim 1, wherein the IEP handles the processing of shared and unshared applications.

5. A system for capturing window events and multicasting the window events to a plurality of application programs, said system comprising:

at least one remote computer having at least a first running application program residing thereon; and a host computer, operatively connected to said remote computer, having a display screen, an inter-access event process procedure, and at least a second running application program residing thereon, said display screen captures incoming window events for said second running application program and forwards the window events to said inter-access event process procedure, and said inter-access event process procedure multicasts the window events to said first and second running application programs.

6. A system as recited in claim 5, wherein the window events captured are motion, button and keyboard events.

7. A system as recited in claim 5, wherein a subset of the captured window events are grouped.

8. A system as recited in claim 5, wherein a subset of the captured window events are ignored.

9. A system as recited in claim 5, wherein at least one of the captured window events is mapped to another event and multicast as the other event to at least one of the running applications.

10. A method for multicasting window events to application windows of running window-based application programs, said method comprising:

capturing an incoming window event when a pointer is in a window;

selecting a plurality of the application windows which are to receive the window event; and multicasting the window event to the plurality of the application windows selected to receive the window event based on a window hierarchical data array.

11. A method as recited in claim 10, wherein the step of multicasting includes multicasting the window event to first and second windows wherein:

the first window corresponds to a first window-based application program running on a first computer; and the second window corresponds to a second window-based application program running on a second computer, different from the first computer.

12. A method as recited in claim 10, wherein the step of multicasting the window event includes multicasting the window event to first and second child windows wherein:

the first child window corresponds to a first window-based application program; and the second child window corresponds to a second window-based application program; and wherein the first and second window-based application programs are running on the same computer.

13. A method as recited in claim 10, wherein the step of capturing includes receiving the incoming window event based upon the pointer entering the window having the incoming window event.

14. A method as recited in claim 10, wherein the step of selecting includes selecting the plurality of the application windows which are to receive the window event based upon a mapping window hierarchy.

15. A method as recited in claim 10, wherein the mapping window hierarchy includes child windows.

* * * * *